(12) United States Patent  
Goto et al.

(10) Patent No.: US 8,256,599 B2  
(45) Date of Patent: Sep. 4, 2012

(54) WAVE SPRING HOLDING STRUCTURE AND FRICTIONAL ENGAGEMENT APPARATUS

(75) Inventors: Shintaro Goto, Nissin (JP); Terasu Harashima, Toyota (JP); Naoki Kato, Togo-cho (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 466 days.

(21) Appl. No.: 12/624,884

(22) Filed: Nov. 24, 2009

(65) Prior Publication Data

US 2010/0126819 A1 May 27, 2010

(30) Foreign Application Priority Data

Nov. 26, 2008 (JP) ................. 2008-300901

(51) Int. Cl.
*F16D 25/0638* (2006.01)
*F16F 1/32* (2006.01)

(52) U.S. Cl. ............ 192/85.24; 192/48.611; 192/109 F; 403/319; 267/161

(58) Field of Classification Search ............. 192/48.611, 192/85.34, 109 B; 403/319, 359.5
See application file for complete search history.

(56) References Cited

U.S. PATENT DOCUMENTS

| | | | | |
|---|---|---|---|---|
| 3,224,539 A | * | 12/1965 | Hensel | 192/85.38 |
| 3,313,385 A | * | 4/1967 | Forster | 192/70.2 |
| 7,225,726 B2 | * | 6/2007 | Onishi et al. | 92/255 |
| 2009/0114501 A1 | * | 5/2009 | Goto et al. | 192/89.22 |

FOREIGN PATENT DOCUMENTS

| | | |
|---|---|---|
| JP | 59-039326 U | 3/1984 |
| JP | 05-187458 A | 7/1993 |
| JP | 07-248035 A | 9/1995 |
| JP | 09-303455 A | 11/1997 |
| JP | 10-184723 A | 7/1998 |
| JP | 11-036987 A | 2/1999 |
| JP | 2005-282807 A | 10/2005 |
| JP | 2007-285382 A | 11/2007 |
| JP | 2007-303534 A * | 11/2007 |
| JP | 2007-315551 A | 12/2007 |

OTHER PUBLICATIONS

Japanese Office Action for corresponding Japanese Patent Application No. 2008-300901 issued on Sep. 7, 2010. Partial.

* cited by examiner

*Primary Examiner* — Richard M. Lorence
(74) *Attorney, Agent, or Firm* — Sughrue Mion, PLLC

(57) ABSTRACT

A wave spring holding structure includes a wave spring that includes crest portions and recessed portions that are alternately formed in a circumferential direction thereof, and a first gap; a circular member provided to be rotatable around an axis; and an arc-shaped snap ring that includes a second gap, and that restricts movement of the circular member in a direction of the axis. The wave spring and the snap ring share the axis with the circular member. The wave spring and the snap ring are rotatable with respect to each other. The wave spring is disposed and held between the circular member and the snap ring so that the crest portions protrude toward the circular member, and the recessed portions protrude toward the snap ring. The first gap is formed in one of the crest portions.

10 Claims, 8 Drawing Sheets

FIG. 2

|  | C1 | C2 | B1 | B2 | B3 | F |
|---|---|---|---|---|---|---|
| 1ST | O | × | × | ◎ | × | △ |
| 2ND | O | × | O | × | × | × |
| 3RD | O | × | × | × | O | × |
| 4TH | O | O | × | × | × | × |
| 5TH | × | O | × | × | O | × |
| 6TH | × | O | O | × | × | × |
| R | × | × | × | O | O | × |
| N | × | × | × | × | × | × |

◎ ENGAGED WHEN ENGINE BRAKE IS APPLIED
△ ENGAGED ONLY WHEN ENGINE DRIVES VEHICLE

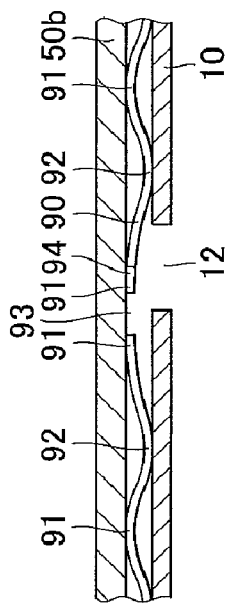
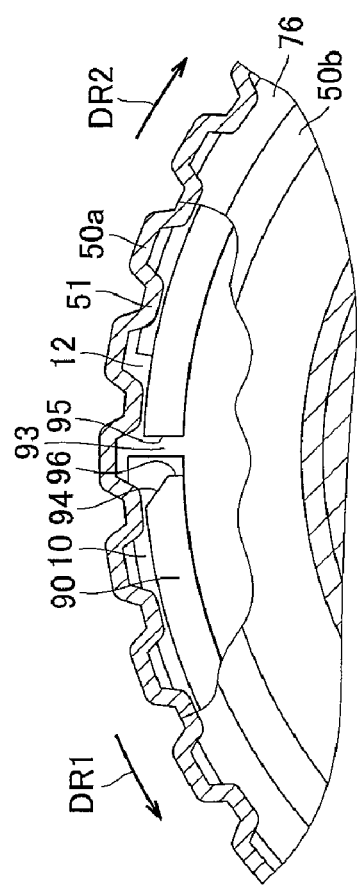

WAVE SPRING HOLDING STRUCTURE AND FRICTIONAL ENGAGEMENT APPARATUS

INCORPORATION BY REFERENCE

The disclosure of Japanese Patent Application No. 2008-300901 filed on Nov. 26, 2008 including the specification, drawings and abstract is incorporated herein by reference in its entirety.

BACKGROUND OF THE INVENTION

1. Field of the Invention

The invention relates to a wave spring holding structure and a frictional engagement apparatus.

2. Description of the Related Art

In a frictional engagement apparatus used in an automatic transmission for a vehicle or the like, a ring-shaped disc spring is disposed between a multiple-disc clutch and a piston that controls engagement of the multiple-disc clutch, to absorb shock when the clutch is engaged. For example, Japanese Patent Application Publication No. 2005-282807 (JP-A-2005-282807) and Japanese Patent Application Publication No. 9-303455 (JP-A-9-303455) describe technologies relating to a conventional disc spring.

The conventional disc spring is a complete ring in which no cut surface is formed in a circumferential direction thereof. The conventional disc spring is manufactured by a punching process, using a press machine and the like. Therefore, the utilization ratio of a material is low, and thus, the cost is increased. Accordingly, there is proposed a spring (a so-called wave spring) having a C-shape, which is formed by bending a belt-shaped spring material, and in which crest portions and recessed portions are alternately formed in a circumferential direction of the spring material (for example, refer to Japanese Patent Application Publication No. 7-248035 (JP-A-7-248035)). Because the wave spring is formed using the belt-shaped spring material cut into an appropriate length, the utilization ratio of the material is significantly improved, as compared to the conventional disc spring formed by a press punching process.

An arc-shaped snap ring, which includes a gap formed at a portion of the snap ring in the circumferential direction thereof, may be employed as one of two mating members between which the wave spring is held. In this case, when the wave spring rotates with respect to the snap ring, an end portion of the wave spring may enter the gap formed in the snap ring, and the function of the wave spring may be impaired.

SUMMARY OF THE INVENTION

The invention provides a wave spring holding structure in which a wave spring is prevented from entering a mating member that holds the wave spring. The invention also provides a frictional engagement apparatus that includes the wave spring holding structure.

An aspect of the invention relates to a wave spring holding structure. The wave spring holding structure includes a wave spring that includes a plurality of crest portions and a plurality of recessed portions that are alternately formed in a circumferential direction of the wave spring, and a first gap formed at a portion of the wave spring in the circumferential direction of the wave spring; a circular member; and a snap ring. The circular member is provided to be rotatable around an axis. The snap ring has an arc shape, and includes a second gap formed at a portion of the snap ring in a circumferential direction of the snap ring. The snap ring restricts movement of the circular member in a direction of the axis. The wave spring and the snap ring are disposed so that the wave spring and the snap ring share the axis with the circular member. The wave spring and the snap ring are rotatable with respect to each other. The wave spring is disposed between the circular member and the snap ring so that the crest portions protrude toward the circular member, and the recessed portions protrude toward the snap ring, and the wave spring is held between the circular member and the snap ring. The first gap is formed in one of the crest portions.

In the wave spring holding structure according to the above-described aspect, the wave spring may include at least one cut portion formed by cutting out a portion of at least one of end portions of the wave spring so that shapes of the end portions are different from each other; and the end portions may face the first gap. The wave spring may include the cut portion formed by cutting out a portion of the end portion of the wave spring, and the portion of the end portion may include a portion of an outer periphery of the wave spring.

Another aspect of the invention relates to a frictional engagement apparatus. The frictional engagement apparatus includes a clutch piston that presses a frictional engagement element including a plurality of friction plates. The frictional engagement apparatus is a frictional engagement apparatus for an automatic transmission. The clutch piston includes a first piston member that has a cylindrical shape, and that is open at both ends; and the circular member that is a second piston member having a disc shape, wherein the second piston member is fitted to an inside of the first piston member. The clutch piston also includes the snap ring that is fitted into a ring-shaped groove formed on an inner peripheral surface of the first piston member, wherein the snap ring restricts movement of the second piston member in the direction of the axis. The clutch piston also includes the wave spring that is held between the second piston member and the snap ring in the wave spring holding structure according to the above-described aspect.

In the wave spring holding structure according to the aspect of the invention, the first gap is formed in one of the crest portions that protrude toward the circular member. Therefore, there is constantly a clearance between the first gap and the snap ring. Thus, when the wave spring rotates with respect to the snap ring, it is possible to prevent the wave spring from entering the second gap formed in the snap ring.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is an operation table showing a relation between each gear and operating states of clutches and brakes in the automatic transmission shown in FIG. 1;

FIG. 9 is a sectional view showing another example in which the wave spring rotates with respect to the snap ring in the embodiment of the invention; and FIG. 10 is a sectional view of a second clutch piston taken along a line X-X in FIG. 3.

DETAILED DESCRIPTION OF EMBODIMENTS

Figure 1:
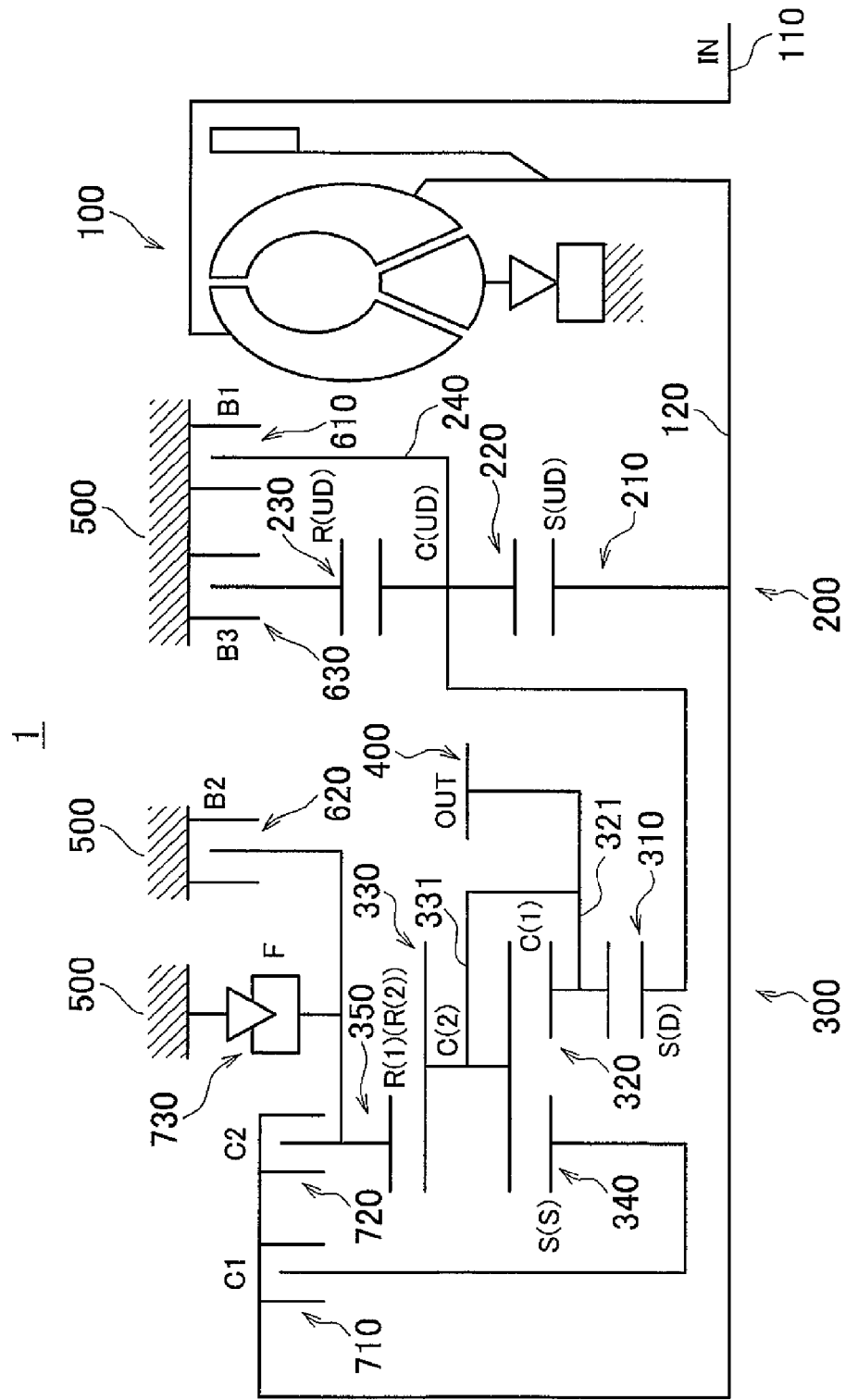
FIG. 1 is a skeleton diagram showing a configuration of an automatic transmission to which a frictional engagement apparatus according to an embodiment of the invention is applied.

Hereinafter, an embodiment of the invention will be described with reference to the drawings. In the drawings, the same or corresponding portions are denoted by the same reference numerals, and the description thereof will not be repeated.

In the embodiment described below, each constituent element is not necessarily indispensable for the invention, unless otherwise specified. Also, in the embodiment described below, if reference is made to numbers of units, amounts, and the like, the numbers of units and the like are exemplary, and the invention is not necessarily limited to the numbers of units, the amounts, and the like, unless otherwise specified.

FIG. 1 is a skeleton diagram showing a configuration of an automatic transmission to which a frictional engagement apparatus according to the embodiment of the invention is applied. The embodiment shows an example in which an automatic transmission 1, which is a power transmission apparatus, is an automatic transmission provided in a vehicle. As shown in FIG. 1, the automatic transmission 1 includes a torque converter 100, a first set 200, a second set 300, an output gear 400, and a gear case 500. The torque converter 100 includes an input shaft 110 connected to a crankshaft, and an output shaft 120. The first set 200 and the second set 300 are planetary gear mechanisms. The automatic transmission 1 includes a B1 brake 610, a B2 brake 620, and a B3 brake 630 that are fixed to the gear case 500, a C1 clutch 710 and a C2 clutch 720, and a one-way clutch 730.

The first set 200 is the single pinion type planetary gear mechanism. The first set 200 includes a sun gear S (UD) 210, a pinion gear 220, a ring gear R (UD) 230, and a carrier C (UD) 240.

The sun gear S (UD) 210 is connected to the output shaft 120 of the torque converter 100. The pinion gear 220 is rotatably supported by the carrier C (UD) 240. The pinion gear 220 engages with the sun gear S (UD) 210 and the ring gear R (UD) 230.

The ring gear R (UD) 230 is fixed to the gear case 500 by the B3 brake 630. The carrier C (UD) 240 is fixed to the gear case 500 by the B1 brake 610.

The second set 300 is the Ravigneaux type planetary gear mechanism. The second set 300 includes a sun gear S (D) 310, a short pinion gear 320, a carrier C (1) 321, a long pinion gear 330, a carrier C (2) 331, a sun gear S (S) 340, and a ring gear R (1) (R (2)) 350.

The sun gear S (D) 310 is connected to the carrier C (UD) 240. The short pinion gear 320 is rotatably supported by the carrier C (1) 321. The short pinion gear 320 engages with the sun gear S (D) 310 and the long pinion gear 330. The carrier C (1) 321 is connected to the output gear 400.

The long pinion gear 330 is rotatably supported by the carrier C (2) 331. The long pinion gear 330 engages with the short pinion gear 320, the sun gear S (S) 340, and the ring gear R (1) (R (2)) 350. The carrier C (2) 331 is connected to the output gear 400.

The sun gear S (S) 340 is connected to the output shaft 120 of the torque converter 100 by the C1 clutch 710. The ring gear R (1) (R (2)) 350 is fixed to the gear case 500 by the B2 brake 620. The ring gear R (1) (R (2)) 350 is connected to the output shaft 120 of the torque converter 100 by the C2 clutch 720. The ring gear R (1) (R (2)) 350 is connected to the one-way clutch 730. The ring gear R (1) (R (2)) 350 is unable to rotate when an engine drives a vehicle in a first gear.

FIG. 2 is an operation table showing a relation between each gear and operating states of the clutches and the brakes in the automatic transmission shown in FIG. 1. In FIG. 2, a circle mark indicates that the clutch or the brake is engaged. A cross mark indicates that the clutch or the brake is disengaged. A double circle mark indicates that the B2 brake 620 is engaged in the first gear only when an engine brake is applied. A triangle mark indicates that the one-way clutch (F) 730 is engaged in the first gear only when the engine drives the vehicle. By operating the brakes and the clutches in combinations indicated in the operation table, the first to sixth forward gears and a reverse gear are achieved.

Figure 3:
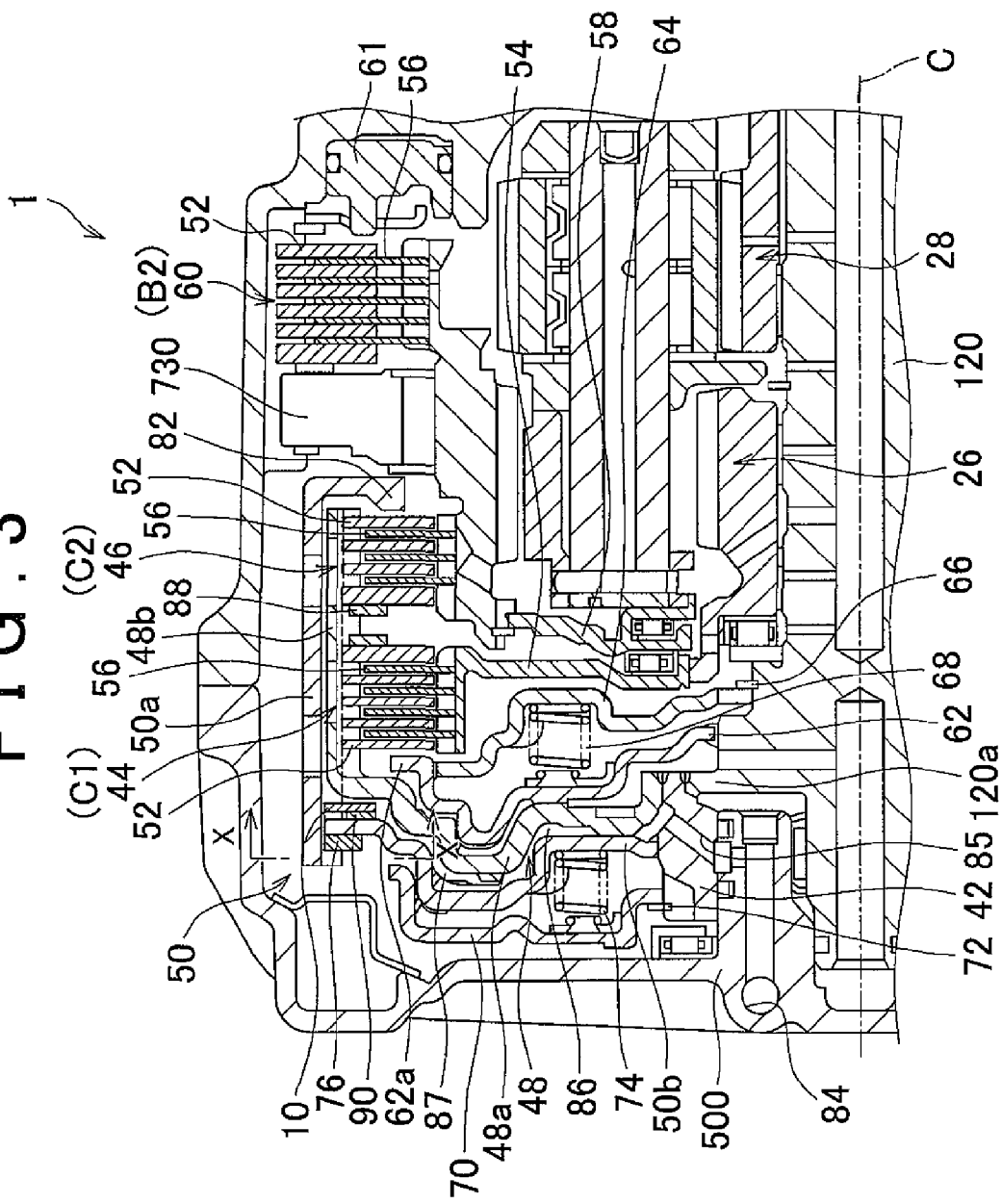
FIG. 3 is a sectional view showing in detail a main portion of a second set of the automatic transmission shown in FIG. 1.

FIG. 3 is a sectional view showing in detail a main portion of the second set 300 of the automatic transmission 1. Because the second set 300 is substantially symmetric with respect to an axis C, a lower half of the second set 300 is omitted. As shown in FIG. 3, the automatic transmission 1 includes the output shaft 120. The output shaft 120 is supported in the gear case 500 through a bearing so that the output shaft 120 is rotatable with respect to the gear case 500. The output shaft 120 rotates around the axis C.

A second planetary gear unit 26 of single pinion type and a third planetary gear unit 28 of double pinion type are provided outside the output shaft 120 in a radial direction. The second planetary gear unit 26 and the third planetary gear unit 28 are supported through a plurality of bushes so that the second planetary gear unit 26 and the third planetary gear unit 28 are rotatable with respect to the output shaft 120. The C1 clutch 710 and the C2 clutch 720 are disposed to selectively transmit rotation of the output shaft 120 to the second planetary gear unit 26 and the third planetary gear unit 28. The B2 brake 620 and the one-way clutch 730 are disposed outside the second planetary gear unit 26 and the third planetary gear unit 28 in a radial direction. The B2 brake 620 selectively stops the rotation of the ring gear R (1) (R (2)) 350 of the second planetary gear unit 26 and the third planetary gear unit 28. The one-way clutch 730 stops the rotation of the ring gear R (1) (R (2)) 350 in one direction.

A flange portion 120a is formed on the output shaft 120. The flange portion 120a extends in a direction perpendicular to the axis C. A ring-shaped base member 42 is disposed on an outer peripheral edge of the flange portion 120a. The base member 42 is integrally welded to the outer peripheral edge of the flange portion 120a. The base member 42 is supported so that the base member 42 is rotatable with respect to the gear case 500. A clutch drum 48 is integrally welded to an outer peripheral surface of the base member 42 at a position close to the second planetary gear unit 26. The clutch drum 48 supports a first frictional engagement element 44 that constitutes the C1 clutch, and a second frictional engagement element 46 that constitutes the C2 clutch. A second clutch piston 50 is fitted to the outer peripheral surface of the base member 42 through a seal so that the second clutch piston 50 covers the clutch drum 48.

The clutch drum 48 is a bottomed cylindrical member that is opened toward one side in an axial direction (a direction in which the axis C extends, i.e., a lateral direction in FIG. 3). The clutch drum 48 includes a bottom portion 48a and a cylinder portion 48b. The bottom portion 48a has a substantially disc shape. An inner peripheral edge of the clutch drum 48 is welded to the outer peripheral surface of the base member 42. The cylinder portion 48b has a cylindrical shape, and is connected to an outer peripheral edge of the bottom portion 48a.

Lengthwise spline teeth are formed on an inner peripheral surface of the cylinder portion 48b. A plurality of friction plates 52 of the first frictional engagement element 44 are spline-fitted to a portion of the cylinder portion 48b, which is close to the bottom portion 48a. The first frictional engagement element 44 constitutes the C1 clutch. The plurality of friction plates 52 of the second frictional engagement element 46 are spline-fitted to a portion of the cylinder portion 48b, which is close to an open end of the cylinder portion 48b. The second frictional engagement element 46 constitutes the second clutch C2.

The first frictional engagement element 44 includes the plurality of friction plates 52, and a plurality of other friction plates 56. Each of the friction plates 56 is disposed between the friction plates 52. The friction plates 56 are spline-fitted to an outer peripheral surface of a first clutch hub 54 that transmits rotation to the ring gear of the second planetary gear unit 26.

The second frictional engagement element 46 includes the plurality of friction plates 52, and the plurality of friction plates 56. Each of the friction plates 56 is disposed between the friction plates 52. The friction plates 56 arc spline-fitted to an outer peripheral surface of a second clutch hub 58 that transmits rotation to the ring gear of the second planetary gear unit 26 and the third planetary gear unit 28. The one-way clutch 730 is connected to the outer peripheral surface of the second clutch hub 58. The friction plates 56 of a third frictional engagement element 60 are spline-fitted to the outer peripheral surface of the second clutch hub 58. The third frictional engagement element 60 constitutes the B2 brake 620.

The third frictional engagement element 60 includes the plurality of friction plates 56 and the plurality of friction plates 52. Each of the friction plates 52 is disposed between the friction plates 56. The friction plates 52 are spline-fitted to the gear case 500. A brake piston 61 is disposed on the opposite side of the third frictional engagement element 60 from the one-way clutch 730. The brake piston 61 is slidably fitted to the gear case 500. When the brake piston 61 presses the third frictional engagement element 60, the B2 brake 620 is engaged.

A first clutch piston 62 and a spring receiving plate 64 are disposed between the clutch drum 48 and the first clutch hub 54. The first clutch piston 62 presses the first frictional engagement element 44. An inner peripheral surface of the first clutch piston 62 is fitted to the output shaft 120 through a seal so that the first clutch piston 62 slides in the axial direction. The first clutch piston 62 includes a pressing portion 62a provided in an outer peripheral surface of the first clutch piston 62. The pressing portion 62a extends toward the first frictional engagement element 44. The spring receiving plate 64 is fitted to the output shaft 120 using a snap ring 66 so that the spring receiving plate 64 is unable to move in the axial direction. A return spring 68 is disposed between the first clutch piston 62 and the spring receiving plate 64. The return spring 68 applies force to the first clutch piston 62 to move the first clutch piston 62 toward the clutch drum 48.

A spring receiving plate 70 is disposed on the opposite side of the second clutch piston 50 from the clutch drum 48. The spring receiving plate 70 is fitted to the outer peripheral surface of the base member 42 by a snap ring 72 so that the spring receiving plate 70 is unable to slide in the axial direction. A return spring 74 is disposed between the second clutch piston 50 and the spring receiving plate 70. The return spring 74 applies force to the second clutch piston 50 to move the second clutch piston 50 toward the bottom portion 48a of the clutch drum 48.

The second clutch piston 50 includes a cylinder member 50a that is an example of the first piston member. The cylinder member 50a has a cylindrical shape, and is open at both ends. The second clutch piston 50 also includes a bottom plate member 50b that is an example of the second piston member. The bottom plate member 50b has a disc shape. The bottom plate member 50b is fitted in one end portion of the cylinder member 50a. The bottom plate member 50b, which is an example of the circular member, is fitted to an inside of the cylinder member 50a. The second clutch piston 50 is fitted to the outer peripheral surface of the base member 42 through a seal. The second clutch piston 50 is supported so that the second clutch piston 50 is unable to rotate with respect to the clutch drum 48. Thus, the second clutch piston 50 rotates integrally with the clutch drum 48. The second clutch piston 50 is provided to be rotatable around the axis C together with the clutch drum 48 that is integrally joined to the base member 42.

A pressing projection portion 82 having a ring shape is provided in a side of the second clutch piston 50, which presses the second frictional engagement element 46. That is, the pressing projection portion 82 is provided in the other end portion of the cylinder member 50a, which is opposite to the above-described one end portion of the cylinder member 50a. The pressing projection portion 82 projects from the other end portion of the cylinder member 50a toward the axis C, that is, toward an inner peripheral side. The pressing projection portion 82 also projects from an inner peripheral edge thereof toward the one end portion of the cylinder member 50a.

A ring-shaped groove, which extends in a circumferential direction of the cylinder member 50a, is formed on an inner peripheral surface of the cylinder member 50a at a position between the bottom plate member 50b and the other end portion of the cylinder member 50a. A snap ring 10 is fitted into the ring-shaped groove. Another ring-shaped groove, which extends in the circumferential direction, is formed on the inner peripheral surface of the cylinder member 50a at a position between the bottom plate member 50b and the one end portion of the cylinder member 50a. A snap ring 76 is fitted into the other ring-shaped groove. An outer peripheral edge portion of the bottom plate member 50b is disposed between the snap rings 10 and 76. A wave spring 90 is also provided between the snap rings 10 and 76. A preload is applied to the wave spring 90. More specifically, the wave spring 90 is held between the bottom plate member 50b and the snap ring 10.

The snap ring 76 functions as a stopper that restricts the bottom plate member 50b, which is fitted in the cylinder member 50a, from moving to an outside of the cylinder member 50a, that is, restricts the bottom plate member 50b from moving toward the left side in FIG. 3 along the axial direction. The snap ring 10 functions as a spring bearing to which one end of the wave spring 90 is fixed. The snap ring 10 also functions as a stopper that restricts the bottom plate member 50b from moving toward an inside of the bottom plate member 50a, that is, restricts the bottom plate member 50b from moving to the right side in FIG. 3 along the axial direction. Thus, the cylinder member 50a and the bottom plate member 50*b* are integrally mounted in a manner such that the bottom plate member 50*b* is fitted in the one end portion of the cylinder member 50*a*.

In a hydraulic frictional engagement apparatus thus configured, when hydraulic oil is supplied through a hydraulic oil supply passage 84 of the gear case 500, the hydraulic oil is supplied to an oil chamber 86 through a hydraulic oil supply hole 85 formed in the base member 42. The oil chamber 86 is formed between the second clutch piston 50 and the clutch drum 48. The oil chamber 86 is closed by a seal member 87 in an oil tight manner. The second clutch piston 50 moves toward a side where the return spring 74 is provided, due to the hydraulic pressure of the supplied hydraulic oil. When the second clutch piston 50 moves in this manner, the pressing projection portion 82 of the second clutch piston 50 presses the second frictional engagement element 46.

A snap ring 88 is fitted to the inner peripheral surface of the cylinder portion 48*h* at a position on the opposite side of the second frictional engagement element 46 from the pressing projection portion 82. The snap ring 88 prevents movement of the friction plates 52 and 56 of the second frictional engagement element 46. Therefore, when the second clutch piston 50 presses the second frictional engagement element 46, the second frictional engagement element 46 is pressed between the snap ring 88 and the pressing projection portion 82, and thus, the second frictional engagement element 46 is engaged.

The snap ring 76 fitted to the cylinder member 50*a* is in close contact with the bottom plate member 50*b*, and in surface contact with the bottom plate member 50*b* due to the urging force of the wave spring 90. Therefore, when the second clutch piston 50 moves, it is possible to appropriately prevent rattling of the cylinder member 50*a* and the bottom plate member 50*b*. Thus, the cylinder member 50*a* and the bottom plate member 50*b* integrally move in the axial direction smoothly. As a result, shift shock is reduced, shift feeling is improved, and shift time is reduced. In addition, the manufacturing cost of the second clutch piston 50 is reduced by using the inexpensive wave spring 90 that is formed by a bending process.

Figure 4:
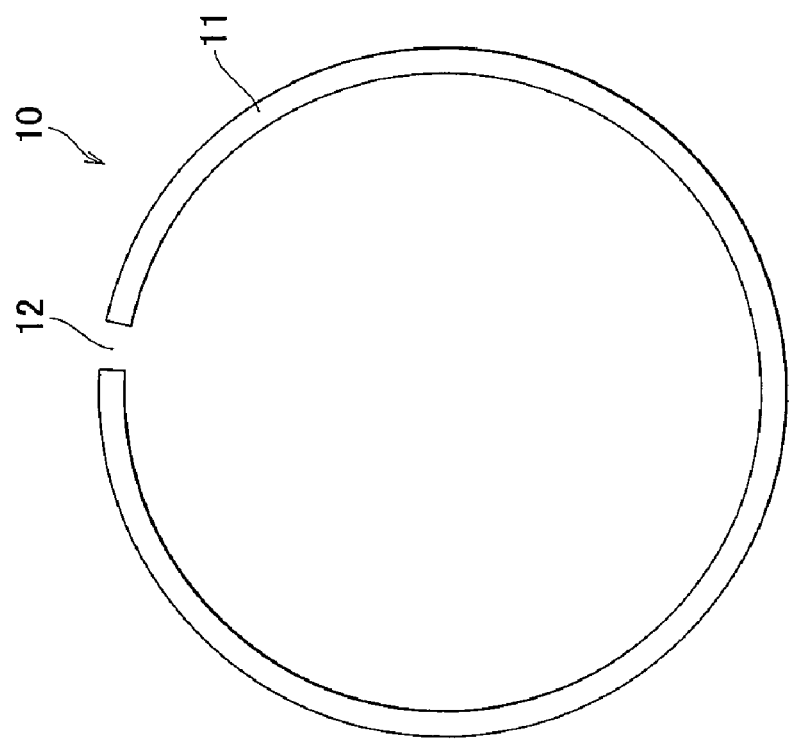
FIG. 4 is a plane view of a snap ring in the embodiment of the invention.

Next, a wave spring holding structure in which the wave spring 90 is held according to the embodiment will be described in detail. FIG. 4 is a plane view of the snap ring 10. The snap ring 10 shown in FIG. 4 is formed by bending a belt-shaped thin flat plate material. The snap ring 10 includes a ring plate portion 11. The ring plate portion 11 has an arc shape in the plane view. A gap 12 is formed at a portion of the arc-shaped ring plate portion 11 in a circumferential direction of the ring plate portion 11. That is, the gap 12 is formed at a portion of the snap ring 10 in a circumferential direction of the snap ring 10.

Figure 5:
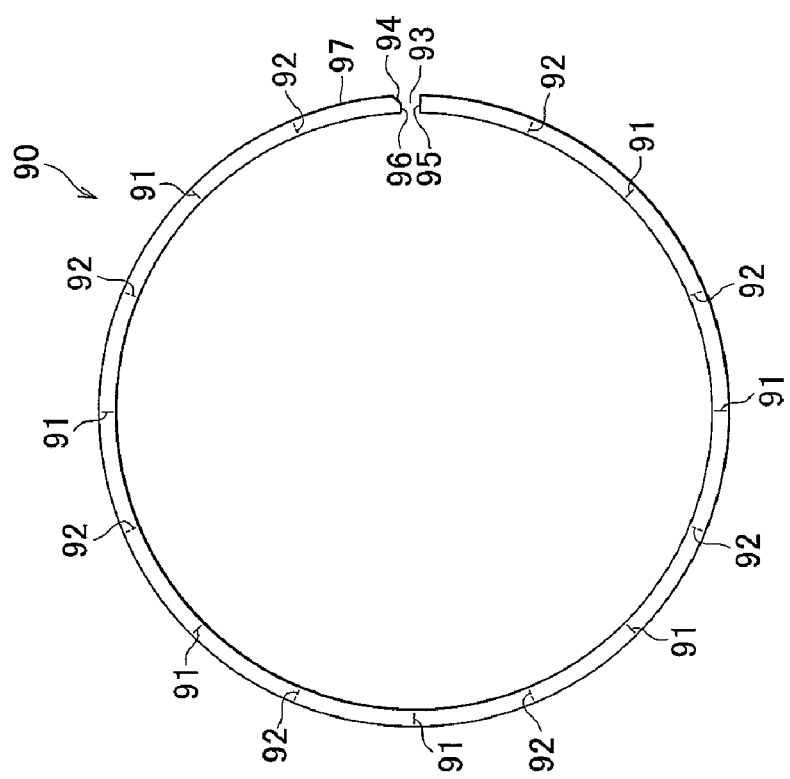
FIG. 5 is a plane view of a wave spring in the embodiment of the invention.

FIG. 5 is a plane view of the wave spring 90. As shown in FIG. 5, the wave spring 90 is formed by bending a belt-shaped spring material such as a rectangular wire material. The wave spring 90 has a substantially C-shape in the plane view. A gap 93 is formed at a portion of the wave spring 90 in a circumferential direction of the wave spring 90. The C-shaped wave spring 90 is corrugated in the circumferential direction of the wave spring 90. Thus, a plurality of crest portions 91 and a plurality of recessed portions 92 are alternately formed in the wave spring 90 in the circumferential direction of the wave spring 90. Because the wave spring 90 is formed by bending the plate material, the material is not wasted, and the utilization ratio of the material is improved to a large extent, as compared to a disc spring having a ring shape that is formed by a punching process.

Paired end portions 95 and 96 face the gap 93 in the wave spring 90. A cut portion 94 is formed in the end portion 96 by cutting out a portion of the end portion 96 of the wave spring 90. The portion of the end portion 96 includes a portion of an outer periphery 97 of the wave spring 90. More specifically, the cut portion 94 is formed by obliquely cutting out a portion of the end portion 96 of the wave spring 90, which includes a portion of the outer periphery 97 of the wave spring 90. In other words, the cut portion 94 is formed by obliquely cutting out a portion of the end portion 96 so that the outer periphery 97 is reduced. Thus, the cut portion 94 obliquely extends from the outer periphery 97 to a position outside an inner periphery of the wave spring 90 in a radial direction of the wave spring 90. The wave spring 90 may include at least one cut portion formed by cutting out a portion of at least one of end portions 95 and 96 that faces the gap 93 so that shapes of the end portions 95 and 96 are different from each other.

The cut portion 94 is formed only in the end portion 96, and is not formed in the end portion 95. Therefore, it is possible to easily distinguish the surface of the wave spring 90 from the reverse surface of the wave spring 90. For example, when the wave spring 90 is mounted, a jig, which has a shape corresponding to the shape of the cut portion 94, is prepared. The wave spring 90 is fitted in the jig, and then, the wave spring 90 is mounted. If the wave spring 90 is inverted, the wave spring 90 cannot be placed in the jig. Therefore, it is possible to prevent the wave spring 90 from being mistakenly inverted and mounted. Also, it is possible to determine whether the wave spring 90 is mounted so that the surface and the reverse surface are orientated in appropriate directions, by monitoring a process in which the wave spring 90 is mounted, using a remote monitoring camera.

It is possible to distinguish the surface of the wave spring 90 from the reverse surface of the wave spring 90, for example, by providing marking on only the surface of the wave spring 90, instead of using the cut portion 94. However, if the marking falls off, foreign substances are generated, and the foreign substances may adversely affect the apparatus. In contrast, when the surface of the wave spring 90 is distinguished from the reverse surface of the wave spring 90 by forming the cut portion 94 as in the embodiment, foreign substances are not generated, and the wave spring 90 is mounted so that the surface and the reverse surface are reliably oriented in the appropriate directions. Accordingly, it is possible to easily perform quality control when the wave spring 90 is mounted. Thus, it is possible to improve the mounting quality of the wave spring 90.

In addition, the cut portion 94 is formed by machining the wave spring 90. If marking is provided on the surface of the wave spring 90 to distinguish between the surface of the wave spring 90 from the reverse surface of the wave spring 90, a new manufacturing facility and a new manufacturing process are required. This increases the manufacturing cost. In contrast, when the surface of the wave spring 90 is distinguished from the reverse surface of the wave spring 90 by forming the cut portion 94, the manufacturing cost is reduced as compared to when the marking is provided on the surface of the wave spring 90.

As shown in FIG. 4 and FIG. 5, each of the snap ring 10 and the wave spring 90 has a substantially ring shape. The snap ring 10 is disposed so that the center of the ring-shaped snap ring 10 coincides with the axis C shown in FIG. 3. The wave spring 90 is disposed so that the center of the ring-shaped wave spring 90 coincides with the axis C. The wave spring 90 and the snap ring 10 are disposed so that the wave spring 90 and the snap ring 10 extend in a direction orthogonal to the axial direction. The wave spring 90 and the snap ring 10 are disposed so that the wave spring 90 and the snap ring 10 share the axis C with the bottom plate member 50b.

Figure 6:
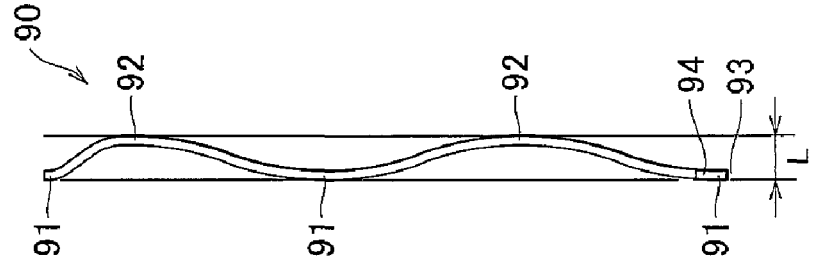
FIG. 6 is a side view of the wave spring in the embodiment of the invention.

FIG. 6 is a side view of the wave spring 90. More specifically, FIG. 6 is the side view showing an upper half of the wave spring 90 extracted from the wave spring 90 in the plane view shown in FIG. 5. In other words, FIG. 6 is the side view showing only the wave spring 90 extracted from a wave spring holding structure (described later) in which the wave spring 90 is held between the bottom plate member 50b and the snap ring 10. That is, FIG. 6 shows the wave spring 90 when a load is applied from each of the bottom plate member 50b and the snap ring 10 to the wave spring 90 in a direction of thickness of the wave spring 90.

As shown in FIG. 6, the crest portions 91 protrude toward one side in the direction of thickness of the wave spring 90. The recessed portions 92 protrude toward the other side in the direction of thickness of the wave spring 90. The crest portions 91 are protruding portions in the surface of the wave spring 90, and the recessed portions 92 are protruding portions in the reverse surface of the wave spring 90. When the wave spring 90 is held between the bottom plate member 50b and the snap ring 10, there is a distance L between the recessed portions 92 in the reverse surface (i.e., the right side of the wave spring 90 in FIG. 6) and the crest portions 91 in the surface (i.e., the left side of the wave spring 90 in FIG. 6).

The gap 93 is formed at a portion of the wave spring 90 in the circumferential direction of the wave spring 90. The gap 93 is formed in one of the crest portions 91. Therefore, the gap 93 is located at the distance L from the recessed portion 92 in the reverse surface. Thus, there is a clearance equivalent to the distance L between the recessed portion 92 in the reverse surface and the gap 93, in the direction of thickens of the wave spring 90.

Figure 7:
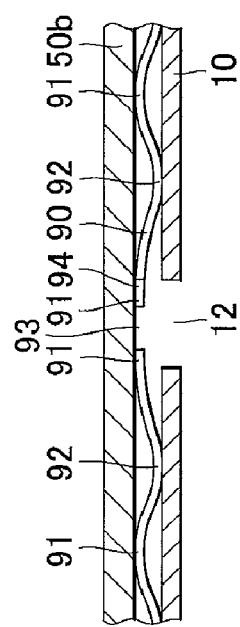
FIG. 7 is a sectional view showing a wave spring holding structure according to the embodiment of the invention.

FIG. 7 is a sectional view showing the wave spring holding structure in which the wave spring 90 is held. As described with reference to FIG. 3, the wave spring 90 is disposed between the bottom plate member 50b and the snap ring 10, and held between the bottom plate member 50b and the snap ring 10. As shown in FIG. 7, the wave spring 90 is disposed so that the crest portions 91 protrude toward the bottom plate portion 50b, and the recessed portions 92 protrude toward the snap ring 10. Thus, the wave spring 90 is held between the bottom plate member 50b and the snap ring 10. The wave spring 90 is disposed so that the crest portions 91 in the surface (i.e., the crest portions 91 that protrude upward in FIG. 7) contact the bottom plate member 50b, and the recessed portions 92 in the reverse surface (i.e., the recessed portions 92 that protrude downward in FIG. 7) contact the snap ring 10.

As described with reference to FIG. 3, the snap ring 10 is fitted in, and held in the ring-shaped groove formed on the inner peripheral surface of the cylinder member 50a. The wave spring 90 is held between the bottom plate member 50b and the snap ring 10. In the plane view of the snap ring 10, each of the outer peripheral surface and the inner peripheral surface of the snap ring 10 has an arc shape. In the plane view of the wave spring 90, each of the outer peripheral surface and the inner peripheral surface of the wave spring 90 has an arc shape. Thus, each of the snap ring 10 and the wave spring 90 does not have any structure for positioning to prevent movement in the circumferential direction. Accordingly, the snap ring 10 and the wave spring 90 are disposed so that the snap ring 10 and the wave spring 90 are rotatable around the axis C. Therefore, the wave spring 90 and the snap ring 10 are disposed so that the wave spring 90 and the snap ring 10 are rotatable with respect to each other.

Figure 8:
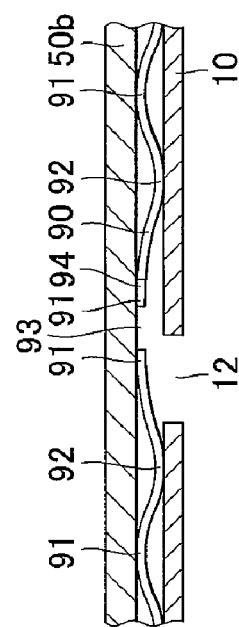
FIG. 8 is a sectional view showing an example in which the wave spring rotates with respect to the snap ring in the embodiment of the invention.

FIG. 8 is a sectional view showing an example in which the wave spring 90 rotates with respect to the snap ring 10. FIG. 9 is a sectional view showing another example in which the wave spring 90 rotates with respect to the snap ring 10. As described above, there is the clearance between the crest portion 91 and the recessed portion 92. The clearance is equivalent to the distance L shown in FIG. 6. Because the gap 93 is located in one of the crest portions 91 of the wave spring 90, there is constantly the clearance equivalent to the distance L between the gap 93 and the snap ring 10.

Therefore, as shown in FIG. 8 and FIG. 9, when the wave spring 90 rotates with respect to the snap ring 10, the clearance between the gap 12 formed in the snap ring 10 and the gap 93 of the wave spring 90 is constantly maintained. Accordingly, it is possible to avoid the situation where the end portions 95 and 96 of the wave spring 90 enter the gap 12, and the function of the wave spring 90 is impaired.

A surface of the bottom plate member 50b, which faces the wave spring 90, is a flat surface in which no cut portion and no gap are formed. Thus, when the wave spring 90 rotates with respect to the bottom plate member 50b, and the gap 93 formed in the crest portion 91 slides with respect to the bottom plate member 50b, the end portions 95 and 96 of the wave spring 90 do not enter the bottom plate member 50b that is a mating member.

FIG. 10 is a sectional view of the second clutch piston 50 taken along a line X-X in FIG. 3. In FIG. 10, a break line indicates a border along which a portion of the bottom plate member 50b is broken. In FIG. 10, the wave spring 90 and the snap ring 10 are shown inside the break line (above the break line). The wave spring 90 and the snap ring 10 are provided between the bottom plate member 50b and the other end portion (the right end portion in FIG. 3) of the cylinder member 50a. As described above, the snap ring 10 is fitted in, and held in the ring-shaped groove formed on the inner peripheral surface of the cylinder member 50a. In contrast, the wave spring 90 is held only by sandwiching the wave spring 90 between the bottom plate member 50b and the snap ring 10. The wave spring 90 is not positioned in the circumferential direction thereof. Therefore, the wave spring 90 is rotatable with respect to the cylinder member 50a.

As described with reference to FIG. 5, the cut portion 94 is formed in the end portion 96 of the wave spring 90. Thus, it is possible to easily distinguish the surface of the wave spring 90 from the reverse surface of the wave spring 90. The portion, which is formed in the wave spring 90 to distinguish the surface of the wave spring 90 from the reverse surface of the wave spring 90, is not limited to the cut portion 94. That is, a portion having any shape may be formed in the wave spring 90 to distinguish the surface of the wave spring 90 from the reverse surface of the wave spring 90. However, the cut portion 94 has the function of making it possible to easily distinguish the surface of the wave spring 90 from the reverse surface of the wave spring 90, and the function of reducing the possibility that the wave spring 90 interferes with the cylinder member 50a when the wave spring 90 rotates with respect to the cylinder member 50a.

That is, as shown in FIG. 10, the cylinder member 50a having a cylindrical shape is provided around the outer periphery of the wave spring 90. The cylinder member 50a includes a plurality of protruding portions 51 that protrude inward in a radial direction of the cylinder member 50a. The protruding portions 51 are spline-fitted to a spline portion (not shown) formed on an outer peripheral surface of the cylinder portion 48b of the clutch drum 48 (refer to FIG. 3). Therefore, the cylinder member 50a is restricted from moving in the circumferential direction thereof with respect to the clutch drum 48. Thus, the cylinder member 50a rotates around the axis C integrally with the clutch drum 48. Also, the cylinder member 50a is able to reciprocate in the axial direction with respect to the clutch drum 48.

When the wave spring 90 rotates with respect to the cylinder member 50a in a DR1 direction shown in FIG. 10, and the end portion 95 interferes with the protruding portion 51 of the cylinder member 50a, the protruding portion 51 interferes with the smooth rotation of the wave spring 90. On the other hand, when the wave spring 90 rotates with respect to the cylinder member 50a in a DR2 direction shown in FIG. 10, because the cut portion 94 is formed, it is possible to reduce the possibility that the end portion 96 interferes with the protruding portion 51. Also, even when the cut portion 94 contacts the protruding portion 51, because the cut portion 94 is inclined with respect to the protruding portion 51, the cut portion 94 moves beyond the protruding portion 51. Thus, the wave spring 90 is slidable with respect to the cylinder member 50a.

That is, because the cut portion 94 is formed by cutting out a portion of the end portion 96, which includes a portion of the outer periphery 97, it is possible to reduce the possibility that the protruding portion 51 interferes with the rotation of the wave spring 90 with respect to the cylinder member 50a in the DR2 direction. The disposition of the wave spring 90 may be adjusted so that the wave spring 90 is rotatable with respect to the cylinder member 50a in only one direction, that is, in only the DR2 direction when the output shaft 120 starts to rotate. In this case, because the output shaft 120 connected to the crankshaft of the engine is rotatable in only one direction, it is possible to more effectively reduce the possibility that the wave spring 90 interferes with the cylinder member 50a.

In the example that has been described, the wave spring 90 is rotatable with respect to both of the bottom plate member 50b and the snap ring 10 that are the mating members between which the wave spring 90 is held. However, as long as the wave spring 90 including the gap 93 (i.e., the opening structure) is rotatable with respect to the snap ring 10 including the gap 12 (i.e., the opening structure) in the wave spring holding structure, it is possible to obtain the same advantageous effect, that is, it is possible to prevent the end portions 95 and 96 from entering the snap ring 10. That is, the wave spring 90 may rotate integrally with the other mating member (i.e., the bottom plate member 50b) that is the other constituent element of the wave spring holding structure, and that is paired with the snap ring 10 including the gap 12.

In the embodiment, the wave spring holding structure, in which the wave spring 90 is held, is applied to the second clutch piston 50 that presses the C2 clutch of the automatic transmission 1. However, the wave spring holding structure according to the embodiment may be applied to the other clutches or brakes.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The wave spring holding structure and the frictional engagement apparatus according to the invention may be particularly advantageously applied to an automatic transmission provided in a vehicle.

What is claimed is:

1. A wave spring holding structure comprising:
   a wave spring that includes a plurality of crest portions and a plurality of recessed portions that are alternately formed in a circumferential direction of the wave spring, and a first gap formed at a portion of the wave spring in the circumferential direction of the wave spring;
   a circular member provided to be rotatable around an axis; and
   a snap ring having an arc shape, which includes a second gap formed at a portion of the snap ring in a circumferential direction of the snap ring, wherein the snap ring restricts movement of the circular member in a direction of the axis,
   wherein
   the wave spring and the snap ring are disposed so that the wave spring and the snap ring share the axis with the circular member;
   the wave spring and the snap ring are rotatable with respect to each other;
   the wave spring is disposed between the circular member and the snap ring so that the crest portions protrude toward the circular member, and the recessed portions protrude toward the snap ring, and the wave spring is held between the circular member and the snap ring; and
   the first gap is formed in one of the crest portions.

2. The wave spring holding structure according to claim 1, wherein
   the wave spring includes at least one cut portion formed by cutting out a portion of at least one of end portions of the wave spring so that shapes of the end portions are different from each other; and
   the end portions face the first gap.

3. The wave spring holding structure according to claim 2, wherein
   the wave spring includes the cut portion formed by cutting out a portion of the end portion of the wave spring, and the portion of the end portion includes a portion of an outer periphery of the wave spring.

4. The wave spring holding structure according to claim 3, wherein
   the cut portion obliquely extends from the outer periphery of the wave spring to a position outside an inner periphery of the wave spring in a radial direction of the wave spring.

5. A frictional engagement apparatus comprising
   a clutch piston that presses a frictional engagement element including a plurality of friction plates,
   wherein
   the frictional engagement apparatus is a frictional engagement apparatus for an automatic transmission, and
   the clutch piston includes:
      a first piston member that has a cylindrical shape, and that is open at both ends;
      the circular member that is a second piston member having a disc shape, wherein the second piston member is fitted to an inside of the first piston member;
      the snap ring that is fitted into a ring-shaped groove formed on an inner peripheral surface of the first piston member, wherein the snap ring restricts movement of the second piston member in the direction of the axis; and
      the wave spring that is held between the second piston member and the snap ring in the wave spring holding structure according to claim 1.

6. The frictional engagement apparatus according to claim 5, wherein
   the wave spring includes at least one cut portion formed by cutting out a portion of at least one of end portions of the wave spring so that shapes of the end portions are different from each other; and
   the end portions face the first gap.

7. The frictional engagement apparatus according to claim 6, wherein
the wave spring includes the cut portion formed by cutting out a portion of the end portion of the wave spring, and the portion of the end portion includes a portion of an outer periphery of the wave spring.

8. The frictional engagement apparatus according to claim 7, wherein
the cut portion obliquely extends from the outer periphery of the wave spring to a position outside an inner periphery of the wave spring in a radial direction of the wave spring.

9. The frictional engagement apparatus according to claim 8, wherein
the first piston member includes a plurality of protruding portions that protrude inward in a radial direction of the first piston member; and
the cut portion is inclined with respect to the protruding portions.

10. The frictional engagement apparatus according to claim 9, wherein
the wave spring is rotatable with respect to the first piston member in only one direction.

* * * * *